(12) United States Patent
Hock

(10) Patent No.: X1001
(45) Date of Patent: Feb. 15, 1809

(54) THRASHING & WINNOWING MACHINS/THRA

(76) Inventor: Lawrence Hock

The Schedule referred to in these Letters Patent
& making part of the same, containing a Descrip-
tion in the Words of the said Laurence Hook him-
self of his thrashing and winnowing machine.

---

This invention consists of the Thrashing
Machine or Mill, the Winnowing Fan, and the
frame or carriage.

The Thrashing Machine which forms the prin-
cipal part of this invention may be divided into
two parts: the feeder, and the Thrashing mill.
The feeder is a stage of such height as to carry
the grain in the straw horizontally to the Thrashing
mill. This is effected by an endless web or cloth
passing over two rollers and carried on and by
a ratchet or rack wheel on the end of one of the rol-
lers, which is moved by a hand in the same manner
as the carriage wheel of the saw mill is propelled.
The sheaf or grain in the straw being laid on
this cloth passes to the thrashing mill regularly
so as to give a uniform supply.

The Thrashing mill which [illegible] as a-
bove mentioned the chief part of the invention
is a contrivance for rubbing the grain from the
ear by the passing it between two serrated or fluted
surfaces. These may be either horizontal or perpendicu-
lar, or forming one part of a circle, or a curve. The
more fully to make known this my invention I
will proceed to describe a thrashing mill the [illegible]
of which is part of a circle. In this case about
the arch of one fourth of a circle will answer well.

having the upper edge of the lower floor, or fixed part
of the mill on or about the same level with the feed
ing cloth. The width of the mill about the same as that
of the feeder and sufficient to take the sheaf [illegible] [illegible]
either way. The bottom, or floor of the mill, which as-
cends in the arc of a circle is of wood or metal, and
fluted or serrated transversely, with the [illegible] edges of
the teeth, ribs or flutes downwards. The thrasher, or
upper and moving part of this machine forms an arch
corresponding with that of the floor and serrated [illegible]
same manner, and may be made either of wood metal
or other proper material. It may be divided in the
middle, and then connected by hinges so that when
the upper part rises above the feeder it may fall back
to receive the grain and straw from the feeder. [illegible]
arms [illegible] one on each side of this moving thrash
er it turns in a centre within a frame so as to be
moved along the arch of the floor by a pitman which
descends from an arm, or shaft above. Hence it will
be seen that as this pitman is raised or lowered
the upper thrasher is carried along the circle or
sweep of the thrashing floor, and the grain [illegible]
is rubbed out. On the upper edge of the moving
thrasher there may be fixed parallel and hor-
izontal knives, which cut the bands of the sheaves
as they enter the mill. After the grain has been rubbed
from the husk, chaff or straw, it descends along the
floor of the mill, falling over its lower edge upon
a riddle which separates the straw and admits
the grain to fall upon a fluted Hopper; from
this Hopper it passes through an aperture, and
as it descends receives the blast of wind from the
flyers of the winnowing fan. The chaff being thus separated, the grain falls on a screen where
the impurities, dirt, and small ([illegible]) parted
from the clean grain.

The winnowing fan has four or more vertical
sails, revolving horizontally, being raised except at
the top, and the air being expelled through an hori-
zontal aperture to the grain as it descends from
the hopper. To give motion to this machine, I have
a horse wheel placed within the frame of the carriage
the toothed horizontal wheel of which works in
the wallower of an horizontal shaft; on the other
end of which is placed a spur wheel which turns
the trundle head on a upright shaft of the flyers
or fan. The same horizontal shaft has at its extreme
end, a crank which by a vertical pitman moves
the arm which carries the pitman of the movable
Thresher; and also the hand which drives the
ratchet wheel of the feeder.

The carriage or frame which contains this ma-
chinery may be placed on Trucks or wheels by
which it can be drawn from place to place when
wanted.

Lawrence Hock

Witnesses
Rich^d. King
Rich^d. [illegible]

Recorded March 6^th 1882.

DRAFTSMAN'S DIVISION.
*All communications should be addressed to*
"The Commissioner of Patents,
Washington, D. C."

**2—328 *a*.**

*DEPARTMENT OF THE INTERIOR,*

United States Patent Office.

*Washington, D. C.,* ........................................, *189*...

*SIR:*

*The printed* ..........copies.......... *of Patent No.* [illegible]
....are.... *exhausted.* Jul 15, 1[illegible]9

*As soon as reprinted a copy will be mailed you to complete your order.*

..................................................................................................................

..................................................................................................................

*By direction of the Commissioner:*

*Very respectfully,*

..................................................................

*Chief Clerk.*

..................................................................

..................................................................

..................................................................

3143b6-97-5m